(12) United States Patent
Raichelgauz et al.

(10) Patent No.: US 9,477,658 B2
(45) Date of Patent: Oct. 25, 2016

(54) SYSTEMS AND METHOD FOR SPEECH TO SPEECH TRANSLATION USING CORES OF A NATURAL LIQUID ARCHITECTURE SYSTEM

(71) Applicant: Cortica, Ltd., Ramat Gan (IL)

(72) Inventors: Igal Raichelgauz, New-York, NY (US); Karina Odinaev, New-York, NY (US); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 186 days.

(21) Appl. No.: 14/302,495

(22) Filed: Jun. 12, 2014

(65) Prior Publication Data

US 2014/0297255 A1    Oct. 2, 2014

Related U.S. Application Data

(63) Continuation-in-part of application No. 13/602,858, filed on Sep. 4, 2012, now Pat. No. 8,868,619, which is a continuation of application No. 12/603,123, filed on Oct. 21, 2009, now Pat. No. 8,266,185, which is a (Continued)

(30) Foreign Application Priority Data

Oct. 26, 2005 (IL) .......................................... 171577
Jan. 29, 2006 (IL) .......................................... 173409
Aug. 21, 2007 (IL) .......................................... 185414

(51) Int. Cl.
*G06F 17/00* (2006.01)
*G06F 17/28* (2006.01)
*G06F 17/30* (2006.01)

(52) U.S. Cl.
CPC ......... *G06F 17/289* (2013.01); *G06F 17/3002* (2013.01)

(58) Field of Classification Search
CPC ........................... G06F 17/30; G06F 17/3002
USPC .................................................. 707/600–899
See application file for complete search history.

(56) References Cited

U.S. PATENT DOCUMENTS 4,972,363 A    11/1990 Nguyen et al.
5,806,061 A    9/1998 Chaudhuri et al.
(Continued)

FOREIGN PATENT DOCUMENTS

WO    0231764    4/2002
WO    20070049282    5/2007

OTHER PUBLICATIONS

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

(Continued)

*Primary Examiner* — Isaac M Woo
(74) *Attorney, Agent, or Firm* — M&B IP Analysis, LLC

(57) ABSTRACT

A method and system for speech to speech translation using a plurality of computational cores of a natural liquid architecture are provided. The method includes receiving an audio signal; identifying a first concept related to the received audio signal; identifying a first language based on the first concept identified for the received audio signal; and determining a match between of the first concept and at least a second concept, wherein the at least second concept represents a target second language.

15 Claims, 4 Drawing Sheets

Related U.S. Application Data continuation-in-part of application No. 12/084,150, filed as application No. PCT/IL2006/001235 on Oct. 26, 2006, now Pat. No. 8,655,801, said application No. 12/603,123 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 12/603,123 is a continuation-in-part of application No. 12/348,888, filed on Jan. 5, 2009, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, and a continuation-in-part of application No. 12/348,888, filed on Jan. 5, 2009.

(60) Provisional application No. 61/833,933, filed on Jun. 12, 2013.

(56) References Cited

U.S. PATENT DOCUMENTS

| | | | |
|---|---|---|---|
| 5,852,435 A | 12/1998 | Vigneaux et al. |
| 5,870,754 A | 2/1999 | Dimitrova et al. |
| 5,887,193 A | 3/1999 | Takahashi et al. |
| 5,940,821 A | 8/1999 | Wical |
| 5,978,754 A | 11/1999 | Kumano |
| 5,987,454 A | 11/1999 | Hobbs |
| 6,038,560 A | 3/2000 | Wical |
| 6,052,481 A | 4/2000 | Grajski et al. |
| 6,076,088 A | 6/2000 | Paik et al. |
| 6,122,628 A | 9/2000 | Castelli et al. |
| 6,144,767 A | 11/2000 | Bottou et al. |
| 6,147,636 A | 11/2000 | Gershenson |
| 6,240,423 B1 | 5/2001 | Hirata |
| 6,243,375 B1 | 6/2001 | Speicher |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,523,022 B1 | 2/2003 | Hobbs |
| 6,524,861 B1 | 2/2003 | Anderson |
| 6,526,400 B1 | 2/2003 | Takata et al. |
| 6,560,597 B1 | 5/2003 | Dhillon et al. |
| 6,594,699 B1 | 7/2003 | Sahai et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,675,159 B1 | 1/2004 | Lin et al. |
| 6,728,706 B2 | 4/2004 | Aggarwal et al. |
| 6,751,363 B1 | 6/2004 | Natsev et al. |
| 6,754,435 B2 | 6/2004 | Kim |
| 6,763,519 B1 | 7/2004 | McColl et al. |
| 6,774,917 B1 | 8/2004 | Foote et al. |
| 6,804,356 B1 | 10/2004 | Krishnamachari |
| 6,819,797 B1 | 11/2004 | Smith et al. |
| 6,836,776 B2 | 12/2004 | Schreiber |
| 6,845,374 B1 | 1/2005 | Oliver et al. |
| 6,901,207 B1 | 5/2005 | Watkins |
| 6,970,881 B1 | 11/2005 | Mohan et al. |
| 6,978,264 B2 | 12/2005 | Chandrasekar et al. |
| 7,006,689 B2 | 2/2006 | Kasutani |
| 7,013,051 B2 | 3/2006 | Sekiguchi et al. |
| 7,043,473 B1 | 5/2006 | Rassool et al. |
| 7,124,149 B2 | 10/2006 | Smith et al. |
| 7,199,798 B1 | 4/2007 | Echigo et al. |
| 7,260,564 B1 | 8/2007 | Lynn et al. |
| 7,277,928 B2 | 10/2007 | Lennon |
| 7,296,012 B2 | 11/2007 | Ohashi |
| 7,302,117 B2 | 11/2007 | Sekiguchi et al. |
| 7,313,805 B1 | 12/2007 | Rosin et al. |
| 7,346,629 B2 | 3/2008 | Kapur et al. |
| 7,392,238 B1 | 6/2008 | Zhou et al. |
| 7,406,459 B2 | 7/2008 | Chen et al. |
| 7,450,740 B2 | 11/2008 | Shah et al. |
| 7,523,102 B2 | 4/2009 | Bjarnestam et al. |
| 7,526,607 B1 | 4/2009 | Singh et al. |
| 7,536,384 B2 | 5/2009 | Venkataraman et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 7,577,656 B2 | 8/2009 | Kawai et al. |
| 7,694,318 B2 | 4/2010 | Eldering et al. |
| 7,836,054 B2 | 11/2010 | Kawai et al. |
| 7,920,894 B2 | 4/2011 | Wyler |
| 7,921,107 B2 | 4/2011 | Chang et al. |
| 7,974,994 B2 | 7/2011 | Li et al. |
| 7,987,194 B1 | 7/2011 | Walker et al. |
| 7,991,715 B2 | 8/2011 | Schiff et al. |
| 8,000,655 B2 | 8/2011 | Wang et al. |
| 8,036,893 B2 * | 10/2011 | Reich ............... G10L 15/187 |
| | | | 379/88.05 |
| 8,098,934 B2 | 1/2012 | Vincent et al. |
| 8,266,185 B2 | 9/2012 | Raichelgauz et al. |
| 8,312,031 B2 | 11/2012 | Raichelgauz et al. |
| 8,316,005 B2 | 11/2012 | Moore |
| 8,326,775 B2 | 12/2012 | Raichelgauz et al. |
| 8,655,801 B2 | 2/2014 | Raichelgauz et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,330,189 B2 | 5/2016 | Raichelgauz et al. |
| 2001/0019633 A1 | 9/2001 | Tenze et al. |
| 2001/0056427 A1 | 12/2001 | Yoon et al. |
| 2002/0087530 A1 | 7/2002 | Smith et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0143976 A1 | 10/2002 | Barker et al. |
| 2002/0163532 A1 | 11/2002 | Thomas et al. |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0078766 A1 | 4/2003 | Appelt et al. |
| 2003/0086627 A1 | 5/2003 | Berriss et al. |

(56) References Cited

U.S. PATENT DOCUMENTS

| | | |
|---|---|---|
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2005/0144455 A1 | 6/2005 | Haitsma |
| 2005/0177372 A1 | 8/2005 | Wang et al. |
| 2006/0013451 A1 | 1/2006 | Haitsma |
| 2006/0020860 A1 | 1/2006 | Tardif et al. |
| 2006/0026203 A1 | 2/2006 | Tan et al. |
| 2006/0031216 A1 | 2/2006 | Semple et al. |
| 2006/0048191 A1 | 3/2006 | Xiong |
| 2006/0064037 A1 | 3/2006 | Shalon et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0248558 A1 | 11/2006 | Barton et al. |
| 2006/0253423 A1 | 11/2006 | McLane et al. |
| 2007/0009159 A1 | 1/2007 | Fan |
| 2007/0011151 A1 | 1/2007 | Hagar et al. |
| 2007/0038608 A1 | 2/2007 | Chen |
| 2007/0042757 A1 | 2/2007 | Jung et al. |
| 2007/0067682 A1 | 3/2007 | Fang |
| 2007/0071330 A1 | 3/2007 | Oostveen et al. |
| 2007/0074147 A1 | 3/2007 | Wold |
| 2007/0130112 A1 | 6/2007 | Lin |
| 2007/0130159 A1 | 6/2007 | Gulli et al. |
| 2007/0168413 A1 | 7/2007 | Barletta et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0163288 A1 | 7/2008 | Ghosal et al. |
| 2008/0165861 A1 | 7/2008 | Wen et al. |
| 2008/0172615 A1 | 7/2008 | Igelman et al. |
| 2008/0201299 A1 | 8/2008 | Lehikoinen et al. |
| 2008/0204706 A1 | 8/2008 | Magne et al. |
| 2008/0253737 A1 | 10/2008 | Kimura et al. |
| 2008/0270373 A1 | 10/2008 | Oostveen et al. |
| 2008/0313140 A1 | 12/2008 | Pereira et al. |
| 2009/0013414 A1 | 1/2009 | Washington et al. |
| 2009/0037408 A1 | 2/2009 | Rodgers |
| 2009/0089587 A1 | 4/2009 | Brunk et al. |
| 2009/0119157 A1 | 5/2009 | Dulepet |
| 2009/0148045 A1 | 6/2009 | Lee et al. |
| 2009/0172030 A1 | 7/2009 | Schiff et al. |
| 2009/0175538 A1 | 7/2009 | Bronstein et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0277322 A1 | 11/2009 | Cai et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0162405 A1 | 6/2010 | Cook et al. |
| 2010/0173269 A1 | 7/2010 | Puri et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0202848 A1 | 8/2011 | Ismalon |
| 2011/0246566 A1 | 10/2011 | Kashef et al. |
| 2011/0251896 A1 | 10/2011 | Impollonia et al. |
| 2011/0313856 A1 | 12/2011 | Cohen et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0197857 A1 | 8/2012 | Huang et al. |
| 2012/0330869 A1 | 12/2012 | Durham |
| 2013/0031489 A1 | 1/2013 | Gubin et al. |
| 2013/0067035 A1 | 3/2013 | Amanat et al. |
| 2013/0086499 A1 | 4/2013 | Dyor et al. |
| 2013/0104251 A1 | 4/2013 | Moore et al. |
| 2013/0173635 A1 | 7/2013 | Sanjeev |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0147829 A1 | 5/2014 | Jerauld |
| 2015/0289022 A1 | 10/2015 | Gross |

OTHER PUBLICATIONS

Cernansky et al., "Feed-forward Echo State Networks"; Proceedings of International Joint Conference on Neural Networks, Montreal, Canada, Jul. 31-Aug. 4, 2005; Entire Document.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Foote, Jonathan et al., "Content-Based Retrieval of Music and Audio"; 1997, Institute of Systems Science, National University of Singapore, Singapore (Abstract).

Freisleben et al., "Recognition of Fractal Images Using a Neural Network", Lecture Notes in Computer Science, 1993, vol. 6861, 1993, pp. 631-637.

Howlett et al., "A Multi-Computer Neural Network Architecture in a Virtual Sensor System Application", International Journal of Knowledge-based Intelligent Engineering Systems, 4 (2). pp. 86-93, 133N 1327-2314, Mar. 10, 2000.

International Search Authority: "Written Opinion of the International Searching Authority" (PCT Rule 43bis.1) including International Search Report for the related International Patent Application No. PCT/US2008/073852; Date of Mailing: Jan. 28, 2009; Entire Document.

International Search Authority: International Preliminary Report on Patentability (Chapter I of the Patent Cooperation Treaty) including "Written Opinion of the International Searching Authority" (PCT Rule 43bis. 1) for the related International Patent Application No. PCT/IL2006/001235; Date of Issuance: Jul. 28, 2009.

International Search Report for the related International Patent Application PCT/IL2006/001235; Date of Mailing: Nov. 2, 2008.

IPO Examination Report under Section 18(3) for corresponding UK application No. GB1001219.3, dated May 30, 2012.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Jaeger, H.: "The "echo state" approach to analysing and training recurrent neural networks", GMD Report, No. 148, 2001, pp. 1-43, XP002466251. German National Research Center for Information Technology.

(56) References Cited

OTHER PUBLICATIONS

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Maass, W. et al.: "Computational Models for Generic Cortical Microcircuits", Institute for Theoretical Computer Science, Technische Universitaet Graz, Graz, Austria, published Jun. 10, 2003.

Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Ortiz-Boyer et al., "CIXL2: A Crossover Operator for Evolutionary Algorithms Based on Population Features", Journal of Artificial Intelligence Research 24 (2005), pp. 1-48 Submitted Nov. 2004; published Jul. 2005.

Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.

Ribert et al. "An Incremental Hierarchical Clustering", Visicon Interface 1999, pp. 586-591.

Verstraeten et al., "Isolated word recognition with the Liquid State Machine; a case study"; Department of Electronics and Information Systems, Ghent University, Sint-Pietersnieuwstraat 41, 9000 Gent, Belgium, Available online Jul. 14, 2005; Entire Document.

Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002; Entire Document.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Boari et al, "Adaptive Routing for Dynamic Applications in Massively Parallel Architectures", 1995 IEEE, Spring 1995.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Garcia, "Solving the Weighted Region Least Cost Path Problem Using Transputers", Naval Postgraduate School, Monterey, California, Dec. 1989.

Mandhaoui, et al, "Emotional Speech Characterization Based on Multi-Features Fusion for Face-to-Face Interaction", Universite Pierre et Marie Curie, Paris, France, 2009.

Marti, et al, "Real Time Speaker Localization and Detection System for Camera Steering in Multiparticipant Videoconferencing Environments", Universidad Politecnica de Valencia, Spain, 2011.

Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.

Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Theodoropoulos et al, "Simulating Asynchronous Architectures on Transputer Networks", Proceedings of the Fourth Euromicro Workshop on Parallel and Distributed Processing, 1996. PDP '96.

Guo et al, "AdOn: An Intelligent Overlay Video Advertising System", SIGIR, Boston, Massachusetts, Jul. 19-23, 2009.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Semizarov et al. "Specificity of Short Interfering RNA Determined through Gene Expression Signatures", PNAS, 2003, pp. 6347-6352.

Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.

Lin, et al., "Robust Digital Signature for Multimedia Authentication: A Summary", IEEE Circuits and Systems Magazine, 4th Quarter 2003, pp. 23-26.

May et al., "The Transputer", Springer-Verlag, Berlin Heidelberg, 1989, teaches multiprocessing system.

Vailaya, et al., "Content-Based Hierarchical Classification of Vacation Images," I.E.E.E: Multimedia Computing and Systems, vol. 1, 1999, East Lansing, MI, pp. 518-523.

Vallet, et al., "Personalized Content Retrieval in Context Using Ontological Knowledge," IEEE Transactions on circuits and Systems for Video Technology, vol. 17, No. 3, Mar. 2007, pp. 336-346.

Whitby-Strevens, "The Transputer", 1985 IEEE, Bristol, UK.

Yanai, "Generic Image Classification Using Visual Knowledge on the Web," MM'03, Nov. 2-8, 2003, Tokyo, Japan, pp. 167-176.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.

Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publication.

Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.

(56) References Cited

OTHER PUBLICATIONS

Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.

Wang et al. "A Signature for Content-based Image Retrieval Using a Geometrical Transform", ACM 1998, pp. 229-234.

Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.

Gomes et al., "Audio Watermaking and Fingerprinting: For Which Applications?" University of Rene Descartes, Paris, France, 2003.

Nam, et al., "Audio Visual Content-Based Violent Scene Characterization", Department of Electrical and Computer Engineering, Minneapolis, MN, 1998, pp. 353-357.

Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.

Chuan-Yu Cho, et al., "Efficient Motion-Vector-Based Video Search Using Query by Clip", 2004, IEEE, Taiwan, pp. 1-4.

Ihab Al Kabary, et al., "SportSense: Using Motion Queries to Find Scenes in Sports Videos", Oct. 2013, ACM, Switzerland, pp. 1-3.

Jianping Fan et al., "Concept-Oriented Indexing of Video Databases: Towards Semantic Sensitive Retrieval and Browsing", IEEE, vol. 13, No. 7, Jul. 2004, pp. 1-19.

Shih-Fu Chang, et al., "VideoQ: A Fully Automated Video Retrieval System Using Motion Sketches", 1998, IEEE, , New York, pp. 1-2.

Wei-Te Li et al., "Exploring Visual and Motion Saliency for Automatic Video Object Extraction", IEEE, vol. 22, No. 7, Jul. 2013, pp. 1-11.

\* cited by examiner

SYSTEMS AND METHOD FOR SPEECH TO SPEECH TRANSLATION USING CORES OF A NATURAL LIQUID ARCHITECTURE SYSTEM

CROSS-REFERENCE TO RELATED APPLICATIONS

This application claims the benefit of U.S. Provisional Application No. 61/833,933, filed on Jun. 12, 2013. This application is also a continuation-in-part of U.S. patent application Ser. No. 13/602,858, filed on Sep. 4, 2012, now pending. The application Ser. No. 13/602,858 is a continuation of U.S. patent application Ser. No. 12/603,123, filed on Oct. 21, 2009, now U.S. Pat. No. 8,266,185. The application Ser. No. 12/603,123 is a continuation-in-part of:

(1) U.S. patent application Ser. No. 12/084,150, filed Apr. 7, 2009, now U.S. Pat. No. 8,655,801, which is the National Stage of International Application No. PCT/IL2006/001235, filed Oct. 26, 2006, which claims foreign priority from Israeli Application No. 171577, filed Oct. 26, 2005, and Israeli Application No. 173409, filed on Jan. 29, 2006;

(2) U.S. patent application Ser. No. 12/195,863, filed Aug. 21, 2008, now U.S. Pat. No. 8,326,775, which claims priority under 35 U.S.C. 119 from Israeli Application No. 185414, filed Aug. 21, 2007. The application Ser. No. 12/195,863 is also a continuation-in-part of the above-referenced U.S. patent application Ser. No. 12/084,150;

(3) U.S. patent application Ser. No. 12/348,888, filed Jan. 5, 2009, now pending, which is a CIP of the above-referenced U.S. patent application Ser. No. 12/084,150 and the above-referenced U.S. patent application Ser. No. 12/195,863; and (4) U.S. patent application Ser. No. 12/538,495, filed Aug. 10, 2009, now U.S. Pat. No. 8,312,031, which is a continuation-in-part of the above-referenced U.S. patent application Ser. No. 12/084,150, the above-referenced U.S. patent application Ser. No. 12/195,863, and the above-referenced U.S. patent application Ser. No. 12/348,888.

All of the applications referenced above are hereby incorporated by reference.

TECHNICAL FIELD

The present invention relates generally to pattern recognition in speech translation and, more particularly, to pattern recognition in audio analysis for speech translation.

BACKGROUND

Sound files, like images, may be indexed by their titles. Unfortunately, if a sound file is simply an embedded or linked audio file on a Web page, there may be no additional information about it. The audio files may have some descriptive information included, such as the source. Other metadata can be included in audio files, but such inclusion requires more effort on the part of the content producer and, as in the case of images, this may be incomplete or insufficient, to say the least.

To fully index the content of audio files generally requires having a transcript of the session in a computer-readable text format to enable text-indexing. With voice recognition software, some automated indexing of audio files is possible and has been successfully used. However, it is widely known that such transcripts rarely match what was spoken exactly. The difficulty is compounded if the spoken words are sung and the search is for the song in a specific tune, or a search for a tune regardless of the words.

Analysis of audio signals is desirable for a wide variety of reasons such as speaker recognition, voice command recognition, dictation, instrument or song identification, and the like. In some instances, it may be desirable to convert human speech from one language to one or more other languages in real-time or at a later time. Particularly, a user listening to an audio signal may wish to hear the contents of the file in another language. Currently real-time speech translation is largely performed by human translators, as any machine-based translation algorithm does not provide reliable results.

It would therefore be advantageous to provide a solution that would overcome the deficiencies of prior art solutions and allow accurate speech or verbal translation from one language to another.

SUMMARY

Certain embodiments disclosed herein include a system and method for speech to speech translation using a plurality of computational cores of a natural liquid architecture. The method includes receiving an audio signal; identifying a first concept related to the received audio signal; identifying a first language based on the first concept identified for the received audio signal; and determining a match between of the first concept and at least a second concept, wherein the at least second concept represents a target second language.

BRIEF DESCRIPTION OF THE DRAWINGS

The subject matter that disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
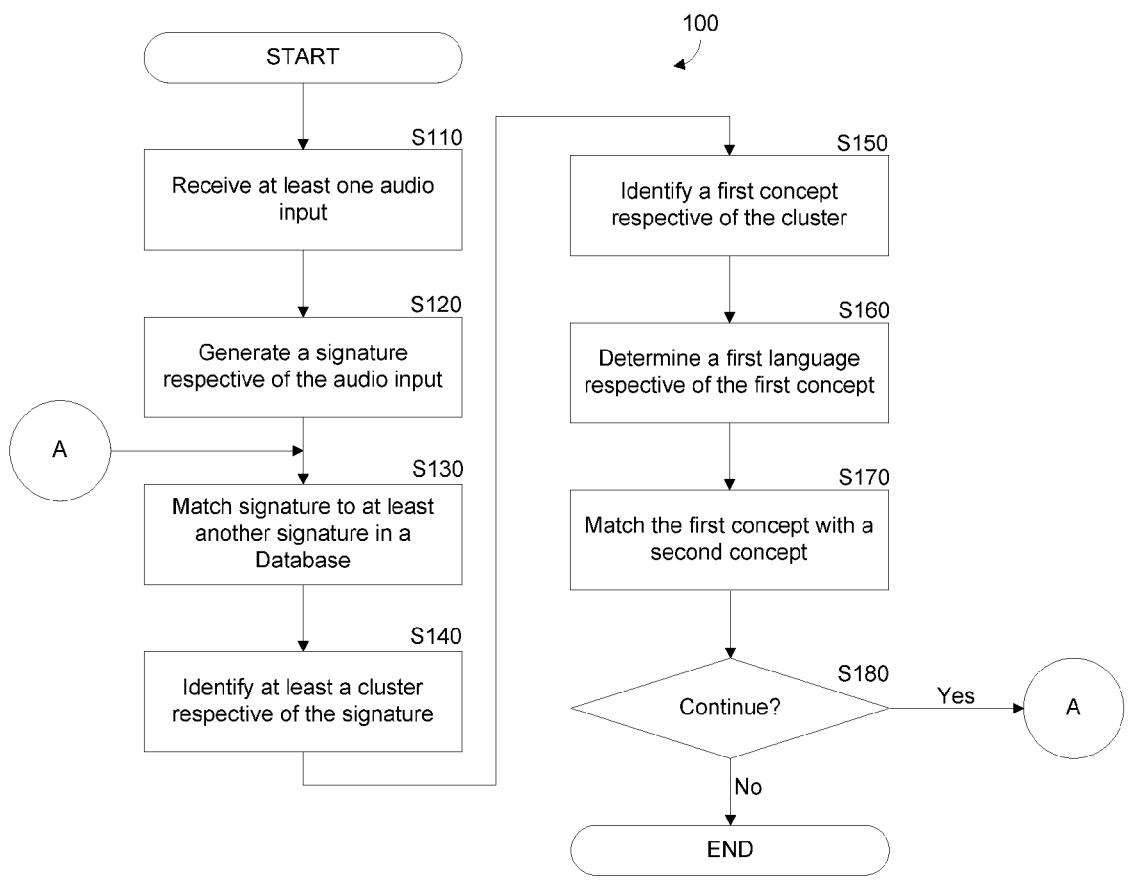
FIG. 1 is a flowchart illustrating a method of speech recognition according to an embodiment.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for speech to speech translation by identification and classification of at least one audio signal. Measurements respective of audio signals result in generation of at least a signature respective of each audio signal or portion thereof. Signatures having at least a partial match form a cluster. The match is referred to as a concept. Concepts can be, for example, tones, musical notes, words, syllables and the like. A language respective of the concept is identified. The concept is then matched to an identical, similar or related concept in one or more languages. By matching similar, identical or related concepts in different languages it is possible to translate human speech in a first language to speech in one or more languages in real time or offline.

FIG. 1 is a non-limiting exemplary flowchart 100 illustrating a method for speech to speech translation according to an embodiment. In S110, at least one audio input is received. The audio input may be a digital representation of an audio signal, a direct feed from one or more microphone devices, a combination thereof, or the like. In an embodiment, a plurality of audio inputs is received respective of a single source. Such an embodiment may be, for example, a plurality of microphones directed at a podium with one or more speakers.

In S120, a measurement respective of the audio input is generated to produce at least a signature. The measurement may be generated respective of, for example, the entire audio input, a part of the audio input, combinations of entire or partial audio inputs, and the like. A measurement may be received respective of a generated signature. A generated signature may be stored in a memory. Generation of signatures and, in particular, generation of signatures for use in speech-to-text systems, is described further in the above-referenced U.S. Pat. No. 8,326,775, assigned to common assignee.

Signature generation may be conducted by a system implementing a computational architecture (hereinafter referred to as "the Architecture") as described in U.S. Pat. No. 8,655,801, referenced above, assigned to common assignee. Generally, the Architecture includes a large ensemble of randomly and independently generated heterogenous computational cores, mapping data-segments onto a high-dimensional space in parallel and generating compact signatures for classes of interest. The process of signature generation is discussed further herein below with respect to FIGS. 3 and 4.

In S130, a generated signature is matched to at least another signature from, e.g., a signature database (SDB). A generated signature may have no match to a signature from an SDB, or a generated signature may have one or more partial or full matches to one or more signatures from the SDB. A group of signatures, wherein each signature within the group has one or more matches, forms a cluster of signatures. Signature matching is discussed in more detail herein below with respect to FIGS. 3 and 4.

In S140, a cluster of signatures is identified respective of the generated signature. A match common to all the signatures within, e.g., a cluster, is a concept. Clusters initially contain a single multimedia data element and exist as an entry in a diagonal two-dimensional matrix. Matching is performed between each cluster in the matrix and the other clusters, and results of matching are stored in each cluster's respective row in the matrix. Clusters that, for example, demonstrate matching above a predefined threshold may be utilized to form new clusters. Clustering of signatures is described in more detail in U.S. Pat. No. 8,386,400, assigned to common assignee, now pending, which is hereby incorporated by reference for all it contains.

In S150, a first concept is identified respective of the cluster. Concepts may be identified based on previously generated concept structures, or based on concept structures generated in response to identification of clusters. The clustering process may map a certain content-universe onto a hierarchical structure of clusters. The content-elements of the content-universe are mapped to signatures as appropriate. The signatures of all of the content-elements are matched to each other and, consequently, such matching generates an inter-match matrix. Generation of the inter-match matrix leads to a set of clusters. This results in a highly compressed representation of the content-universe. Concept generation and identification is discussed in more detail in the above-referenced U.S. Pat. No. 8,266,185, assigned to common assignee, which is hereby incorporated by reference for all that it contains.

A first language may share a concept with a second language. Languages typically share concepts when words or phrases in one language have the same or similar meanings as words or phrases in other languages.

As a non-limiting example of a concept shared among languages, the words "cat" (in the English language) and "gato" (in the Spanish language) may share a concept, wherein the concept represents the animal species "Felis catus", or the common housecat, which has a variety of signatures in other languages all representing the 'Felis catus' concept. As a further non-limiting example, the word "tiger" may be sufficiently related to the 'Felis catus' concept that it may be returned as one of the signatures of the cluster of signatures when a signature is generated for the word "gato." In an embodiment, where only the closest matching signature in each language is utilized, the word "cat" would likely be utilized instead of the word "tiger" because the word "cat" is closer to the generated signature's concept.

A "tree" is a concept which may be present in a plurality of languages, with a different signature or signatures in each language. By matching concepts in different languages, it is possible to translate speech in a first language to speech in one or more languages. Translation may depend on the amount and quality of concept matches. Quality of matches may be determined, for example, by crossing a certain threshold. Trees may be stored, e.g., as a group of words associated with metadata representing each word's respective language.

As a non-limiting example of a "tree" concept, the concept of 'Felis catus' (the species of the common house cat) may be represented in a plurality of languages as the equivalent words "cat" (English language), "gato" (Spanish language), "neko" (Japanese language), and so on. When the word "cat" or its other-language equivalent appears in an audio signal and a signature is generated thereto, any or all of the equivalent words among the tree for the concept Felis catus may be identified and/or provided as translations of the original word.

In S160, a first language respective of the first concept is determined. The language may be determined by different classification techniques. One such example is a statistical approach based on prevalence of certain function words (such as the word "the" in the English language). Another example is to create a language n-gram model from a training text or audio file for each language which the system may detect. For any text or audio for which a language needs to be determined, a similar model is made, and that model is compared to each stored language model. The most likely language is the one with the model that is most similar to the model from the text or audio needing to be identified.

In S170, the first concept is matched with a second concept, the second concept belonging to a second language. Matching may be performed, for example, by statistically identifying proximity of signatures or concepts to each other. In the above example, the concept of "tree" may often appear in proximity to words such as "green", "brown", "tall", and so on in the English language. The concept of "arbre" may often appear in proximity to words such as "vert", "brun" and "grand" in the French language. It is therefore statistically possible to match "tree" to "arbre" with a degree of certainty determined, for example, by a threshold. Proximity may be based on whether such words appear within the same sentence, paragraph, and the like. Proximity may be, for example, audio detected within a window of time before or after the concept. In another embodiment, proximity may additionally be determined by considering placement of the second concept within written text.

In an embodiment, the second concept may only be matched if it is associated with a desired second language. As an example, if the desired second language is English, words that are similar may only be provided as a match if such words are associated with the English language. Association with a language may be determined based on, e.g., metadata associated with the concepts. Which language is desired as the second language may be determined by, but is not limited to, user preferences provided by a user, a user profile based on previously identified concepts by that user, and so on.

A user profile may be generated and/or modified based on a user's impressions with respect to multimedia content elements. Impressions may be determined based on, but is not limited to, a user gesture; adjustment to computer volume by a user, time spent viewing, interacting with, or listening to a multimedia content element; key strokes entered while viewing or listening to a multimedia content element; and so on. A user gesture may be, but is not limited to, a mouse click, a mouse scroll a tap, a swipe, and any other gesture on a device having a touch screen display or a pointing device. User profiles and user impressions are discussed in more detail in U.S. patent application Ser. No. 13/856,201 assigned to common assignee, which is hereby incorporated by reference for all that it contains.

As a non-limiting example of matching based on a user profile, past interaction with multimedia content featuring English language text and audio demonstrate a positive impression of English language content, thereby causing a subsequently generated user profile to associate the user with the English language as an English language speaker. When the user later listens to an audio file containing Italian speech, the concepts of the words in the audio file are determined and matched respective of related second concepts associated with the English language.

In S180, it is determined whether further signature matching is required. If so, execution continues with S130; otherwise, execution terminates. Identification of concepts respective of audio signals may allow classification of such signals with respect to their content.

Figure 2:
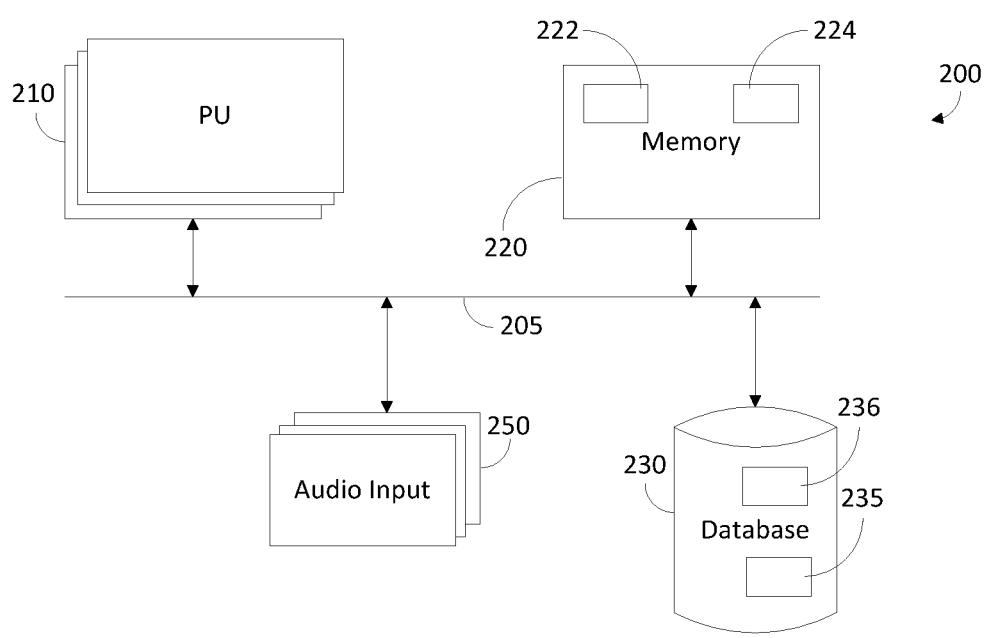
FIG. 2 is a schematic diagram illustrating a system constructed according to an embodiment.

FIG. 2 is an exemplary and non-limiting schematic illustration of a system 200 for pattern recognition in speech translation implemented according to an embodiment. The system 200 comprises at least one processing element 210. Processing element 210 may be, for example, a processing unit (PU). In various other embodiments, a plurality of PUs may be used. The at least one PU is coupled via a bus 205 to a memory 220. In an embodiment, the memory 220 further comprises a memory portion 222 containing instructions that, when executed by the processing element 210, performs the method described in more detail herein. The memory may be further used as a working scratch pad for the processing element 210, a temporary storage, and so on. The memory may be a volatile memory such as, but not limited to random access memory (RAM), or a non-volatile memory (NVM) such as, but not limited to, Flash memory.

The memory 220 may further comprise memory portion 224 containing one or more match scores between a cluster and a concept. Memory portion 224 or a secondary memory (not shown) may contain a measurement respective of an audio signal.

The processing element 210 may further be coupled to at least one audio input 250. A plurality of audio inputs may be used to represent different signals, a single signal received from a plurality of locations, or any combination thereof. The processing element 210 may be further coupled to a database 230.

The database 230 is configured to maintain a storage portion 235 containing a plurality of concepts respective of a plurality of languages which form a Concept Database (CDB). The database 230 may also further comprise storage portion 236 containing at least a signature which forms a signature database (SDB). The concept signals may be used to determine a match score between an identified cluster and one or more concepts, or to determine a match score between a signal and one or more concepts.

In an embodiment, the processing element 210 is configured to run or to include a plurality of computational cores that formed the Architecture. As demonstrated herein the Architecture is a large ensemble of randomly and independently generated heterogenous computational cores, mapping data-segments onto a high-dimensional space in parallel and generating compact signatures for classes of interest. In this embodiment, the processing element 210 can be utilized to generate signatures for input audio files and such signatures in the database 230. In another embodiment, the processing element 210 can create concepts respective of generates and compare between concepts either saved locally in the database 230 or in external source. In an embodiment, the system is connected to a deep-content-classification (DCC) system (not shown). The DCC system is configured to generate concepts, perform inter-matching concepts and find one or more concepts that matches at least one generated signature. An exemplary DCC system that can be utilized is disclosed in more detail in U.S. Pat. No. 8,266,185, assigned to common assignee, which is hereby incorporated by reference for all that it contains.

In an embodiment, the system 200 is configured to query the DCC system using a generated signature to find at least one matching concept. In addition, the system 200 can query the DCC system to find a match between two concepts generated by the system to find a matching concept to a concept generated by the system. Matching query can be found using a signature representing the concept.

To demonstrate an example of signature generation process, it is assumed, merely for the sake of simplicity and without limitation on the generality of the disclosed embodiments, that the signatures are based on a single audio frame or a sample, leading to certain simplification of the computational cores generation. The Matching System is extensible for signatures generation capturing the dynamics in-between the frames.

Figure 3:
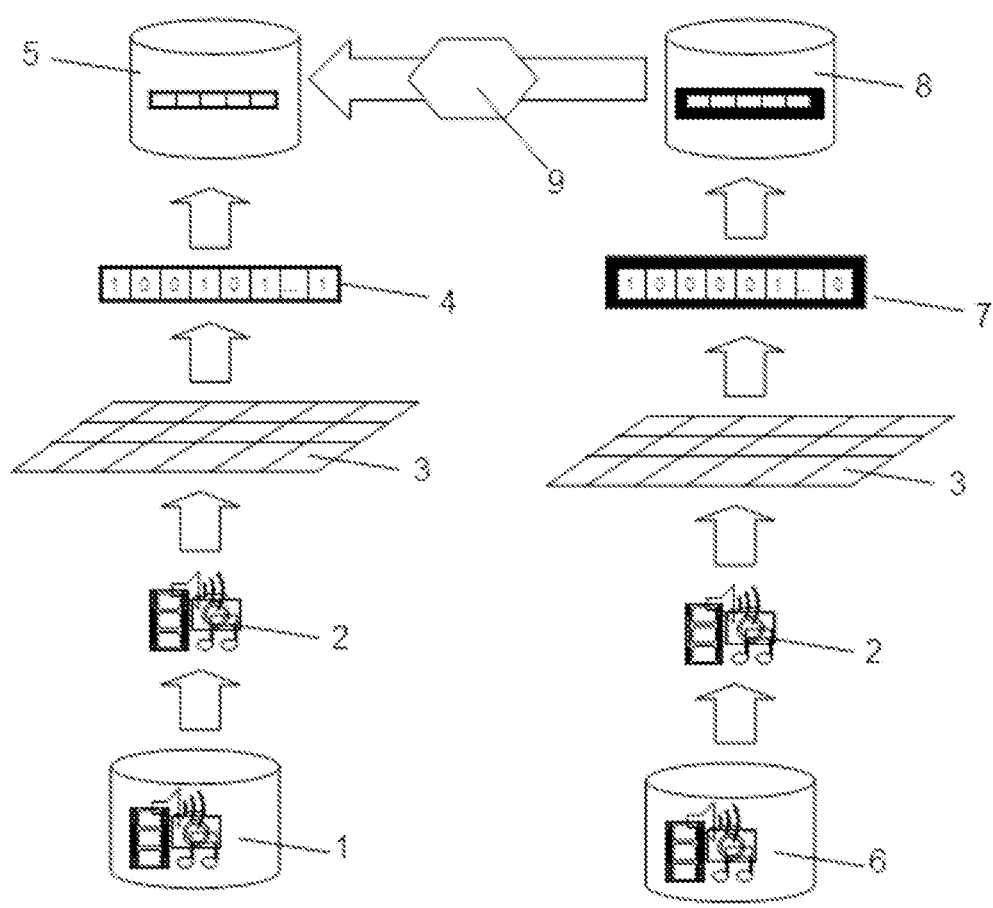
FIG. 3 is a block diagram depicting the basic flow of information in a large-scale multimedia content matching system.
Figure 4:
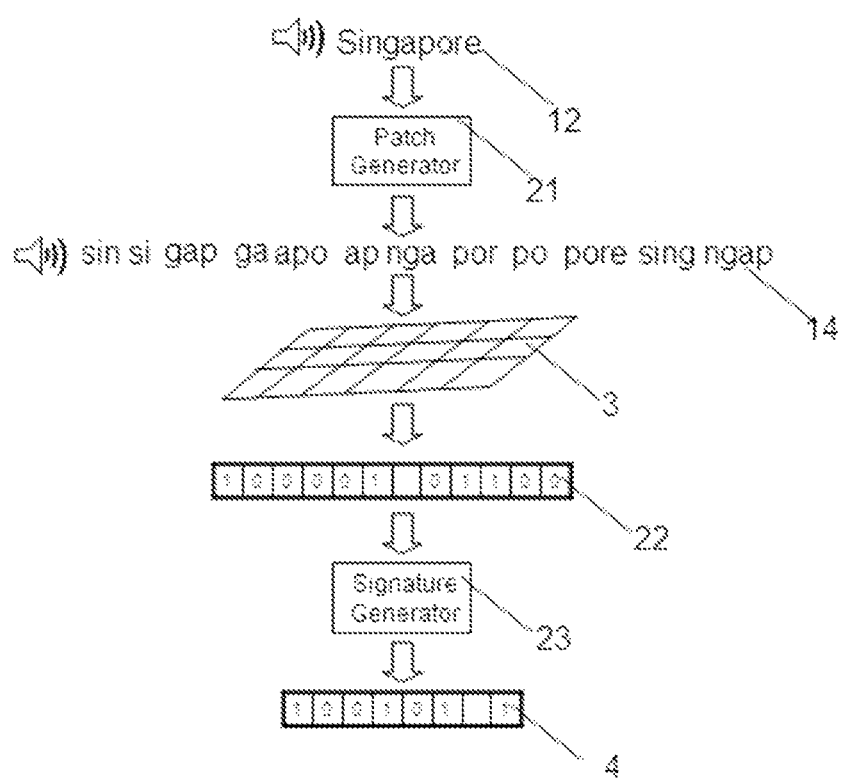
FIG. 4 is a diagram showing the flow of patches generation, response vector generation, and signature generation in a large-scale speech-to-text system.

FIGS. 3 and 4 illustrate the generation of signatures for the multimedia content elements by a signature generator system according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

The Signatures' generation process will now be described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of a server and a signature generation system. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i = \{n_i\}$ (1≤i≤L) may consist of a single leaky integrate-to-threshold unit (LTU) node or more nodes. The node $n_i$ equations are:

$$V_i = \sum_j w_{ij} k_j$$

$$n_i = \Theta(V_i - Th_x)$$

where, $\Theta$ is a Heaviside step function; $w_{ij}$ is a coupling node unit (CNU) between node i and image component j (for example, grayscale value of a certain pixel j); $k_j$ is an image component T (for example, grayscale value of a certain pixel j); Thx is a constant Threshold value, where x is 'S' for Signature and 'RS' for Robust Signature; and Vi is a Coupling Node Value.

The Threshold values Thx are set differently for Signature generation and for Robust Signature generation. For example, for a certain distribution of Vi values (for the set of nodes), the thresholds for Signature (ThS) and Robust Signature (Th$_{RS}$) are set apart, after optimization, according to at least one or more of the following criteria:

1: For: $V_i > Th_{RS} 1 - p(V > Th_S) - 1 - (1-\epsilon)^l \ll 1$ i.e., given that nodes (cores) constitute a Robust Signature of a certain image I, the probability that not all of these I nodes will belong to the Signature of same, but noisy image, Ĩ is sufficiently low (according to a system's specified accuracy).

2: $p(V_i > Th_{RS}) \approx l/L$ i.e., approximately 1 out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. Detailed description of the Signature generation is discussed in more detail in the co-pending patent applications of which this patent application is a continuation-in-part, which are hereby incorporated by reference.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

Detailed description of the Computational Core generation and the process for configuring such cores is discussed in more detail in the above-referenced U.S. Pat. No. 8,655,801, assigned to the common assignee, which is hereby incorporated by reference for all that it contains.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for speech to speech translation using a plurality of computational cores of a natural liquid architecture, comprising:
   receiving an audio signal;
   identifying a first concept related to the received audio signal;
   identifying a first language based on the first concept identified for the received audio signal;
   determining a match between the first concept and at least a second concept by:
   identifying a first plurality of concepts in the first language, wherein the first plurality of concepts is statistically proximate to the first concept and previously matched to a second plurality of concepts, wherein the second plurality of concepts is respective of the second target language; and
   identifying the second concept statistically proximate to the second plurality of concepts, wherein the statistical proximity is determined by use of a threshold, wherein the at least second concept represents a target second language.

2. The method of claim 1, wherein the received audio signal is at least one of: a digital representation of an audio signal, and a direct feed from at least one microphone device.

3. The method of claim 1, wherein a plurality of audio signals is received respective of a single source.

4. The method of claim 1, wherein identifying the first concept further comprises: generating at least one signature respective of the received audio signal, and matching the generated at least one signature to at least another signature from a signature database, wherein the at least one signature is generated by the plurality of computational cores of the natural liquid architecture.

5. The method of claim 4, wherein the at least one signature is generated respective of at least one of: the entire audio signal, a part of the audio signal, and a combination of entire or partial audio signals.

6. The method of claim 1, further comprising:
   determining a match respective of the first concept and a third concept, wherein the third concept is respective of a second target language.

7. The method of claim 1, wherein the identification of matching concepts is performed by the plurality of computational cores of the natural liquid architecture.

8. A non-transitory computer readable medium having stored thereon instructions for causing one or more processing units to execute the method according to claim 1.

9. A system for speech to speech translation, comprising:
   a processing element;
   an interface coupled to the processing element, wherein the interface is configured to receive at least one audio signal; and
   a memory communicatively connected to the processing element, wherein the memory contains instructions that, when executed by the processing element, configure the processing element to:
   identify a first concept in the received at least audio input;
   identify a first language based on the first concept identified for the received audio signal;
   identify a first plurality of concepts in the first language, wherein the first plurality of concepts is statistically proximate to the first concept and previously matched to a second plurality of concepts, wherein the second plurality of concepts is in the target language; and
   identify a second concept statistically proximate to the second plurality of concepts, wherein the statistical proximity is determined by use of a threshold in order to determine a match respective of the first concept and the second concept, wherein the second concept is respective of a target language.

10. The system of claim 9, wherein the processing element is configured to execute a plurality of computational cores of a natural liquid architecture.

11. The system of claim 10, the system is further configured to:
    determine a match respective of the first concept and a third concept, wherein the third concept is respective of at least a second target language.

12. The system of claim 9, wherein the received audio signal is at least one of: a digital representation of an audio signal, and a direct feed from at least one microphone device.

13. The system of claim 9, wherein a plurality of audio signals is received respective of a single source.

14. The system of claim 13, wherein the signature is generated respective of any one of: the entire audio input, a part of the audio input, and a combination of entire or partial audio inputs.

15. The system of claim 9, wherein the system is further configured to: generate at least one signature respective of the received audio signal and match the generated at least one signature to at least another signature from a signature database.

* * * * *